(12) United States Patent
Vial

(10) Patent No.: US 8,996,201 B2
(45) Date of Patent: Mar. 31, 2015

(54) METHOD AND DEVICE FOR SHARING DATA BETWEEN ON-BOARD SYSTEMS IN AN AIRCRAFT

(75) Inventor: Jean-Sebastien Vial, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1054 days.

(21) Appl. No.: 12/539,354

(22) Filed: Aug. 11, 2009

(65) Prior Publication Data

US 2010/0145553 A1    Jun. 10, 2010

(30) Foreign Application Priority Data

Aug. 20, 2008  (FR) ...................................... 08 55652

(51) Int. Cl.

| | | |
|---|---|---|
| G01C 23/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| G06F 7/70 | (2006.01) | |
| G06F 19/00 | (2011.01) | |
| G06G 7/00 | (2006.01) | |
| G06G 7/76 | (2006.01) | |
| G07C 5/08 | (2006.01) | |
| G08G 5/00 | (2006.01) | |

(52) U.S. Cl.
CPC .............. *G07C 5/0816* (2013.01); *G01C 23/00* (2013.01); *G08G 5/0008* (2013.01)
USPC ................................................ 701/3; 701/14

(58) Field of Classification Search
USPC ........................... 701/3, 10, 14; 340/945, 971
See application file for complete search history.

(56) References Cited

U.S. PATENT DOCUMENTS

| | | | | |
|---|---|---|---|---|
| 4,635,030 A | * | 1/1987 | Rauch ........................... | 340/945 |
| 5,036,466 A | * | 7/1991 | Fitzgerald et al. ............ | 235/400 |
| 5,522,026 A | * | 5/1996 | Records et al. ................ | 715/710 |
| 5,808,563 A | * | 9/1998 | Ching et al. ................... | 340/976 |
| 5,883,586 A | * | 3/1999 | Tran et al. ..................... | 340/945 |

(Continued)

FOREIGN PATENT DOCUMENTS

| | | |
|---|---|---|
| EP | 0 407 179 A1 | 1/1991 |
| EP | 1 455 313 A1 | 9/2004 |

OTHER PUBLICATIONS

Philip A Scandura, Jr., et al., "A Unified System to Provide Crew Alerting, Electronic Checklists and Maintenance Using IVHM", Digital Avionics Systems Conference, IEEE, XP010764903, Oct. 24-28, 2004, pp. 7.E.5-1-7.E.5-19.

*Primary Examiner* — Nicholas Kiswanto
(74) *Attorney, Agent, or Firm* — Oblon, McClelland, Maier & Neustadt, L.L.P.

(57) ABSTRACT

A method and a device are disclosed for exchanging data between a technical management system of an aircraft and a mission management system of the aircraft, in order to permit one of the systems to determine the consequences of an event detected in the other of the systems. After at least one event has been detected in one of the technical management and mission management systems of the aircraft, at least one information item pertaining to the detected event is transmitted to the other of the technical management and mission management systems of the aircraft. The consequences of the event detected in the other of the technical management and mission management systems of the aircraft are then determined. The adaptation of at least one datum of the other of the technical management and mission management systems of the aircraft is evaluated in response to the determination.

13 Claims, 9 Drawing Sheets

(56) References Cited

U.S. PATENT DOCUMENTS

| | | | |
|---|---|---|---|
| 6,002,347 A * | 12/1999 | Daly et al. | 340/963 |
| 6,493,609 B2 * | 12/2002 | Johnson | 701/3 |
| 6,697,718 B2 * | 2/2004 | Le Draoullec et al. | 701/31.6 |
| 6,701,227 B2 * | 3/2004 | McConnell | 701/3 |
| 6,735,500 B2 * | 5/2004 | Nicholas et al. | 701/3 |
| 7,188,006 B2 * | 3/2007 | Salvado et al. | 701/3 |
| 7,203,630 B2 * | 4/2007 | Kolb et al. | 703/6 |
| 7,772,995 B2 * | 8/2010 | Cabaret De Alberti et al. | 340/980 |
| 2004/0111197 A1 | 6/2004 | Kipersztok et al. | |
| 2006/0112119 A1 * | 5/2006 | Vian et al. | 707/101 |
| 2006/0164261 A1 | 7/2006 | Stiffler | |
| 2007/0127460 A1 * | 6/2007 | Wilber et al. | 370/389 |
| 2010/0023201 A1 * | 1/2010 | Kinney et al. | 701/33 |

\* cited by examiner

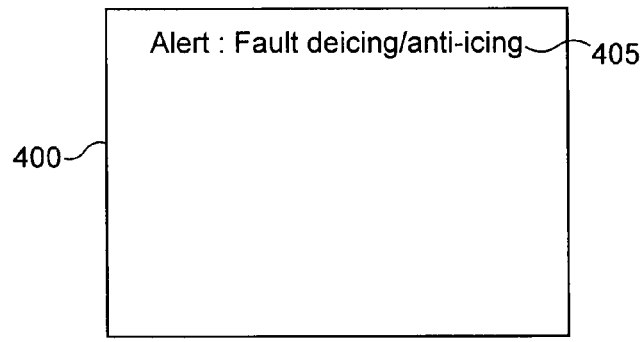
Fig. 4
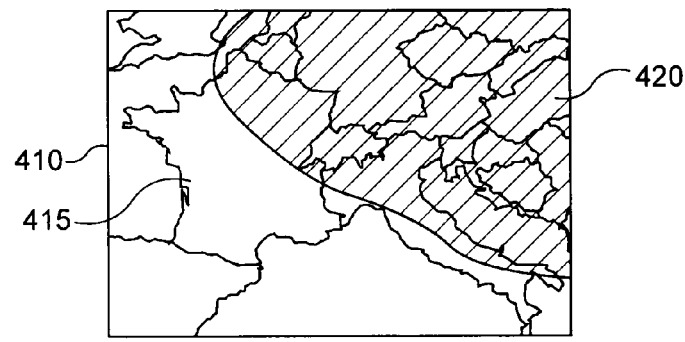
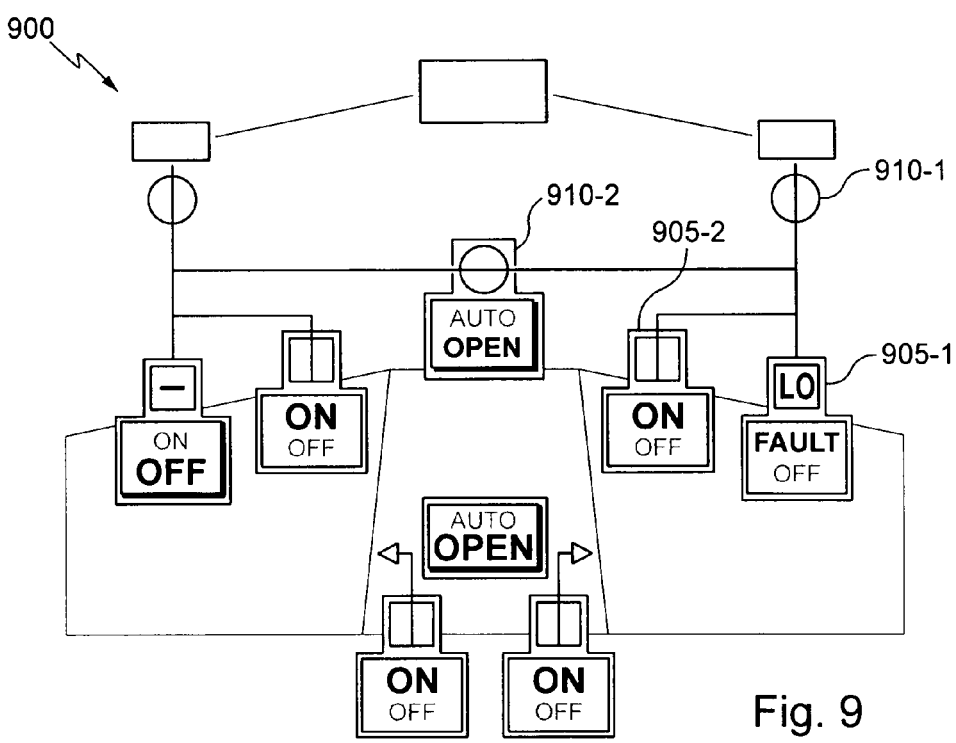
Fig. 9

METHOD AND DEVICE FOR SHARING DATA BETWEEN ON-BOARD SYSTEMS IN AN AIRCRAFT

BACKGROUND OF THE INVENTION

1. Field of the Invention

The present invention relates to the management of systems installed on board aircraft and more particularly to a method and a device for sharing data between systems installed on board an aircraft in order to improve the control interface of these systems.

2. Discussion of the Background

The electronic and networking systems installed on board aircraft relate to distinct functionalities. A first type of systems, known as avionic, relates to assisting the aircraft crew in assuring its tasks of piloting, navigation, communication, environmental monitoring and mission management. This type of systems relates in particular to flight control systems, the automatic pilot, communication (voice and data) and navigation systems (radio, inertial, autonomous) systems and environmental monitoring systems (radar, weather, ground anti-collision and traffic anti-collision). In particular, mission management systems permit the pilot to manage his trajectory (ground preparation, flight tracking and modification) on the basis of airline company requirements, of integration of the aircraft into the air traffic and of the environment, such as weather reports and NOTAMs (acronym for NOtice To Air Men in English terminology). The second type of systems relates to generation and distribution of electrical capacity, generation and distribution of hydraulic capacity, generation of pneumatic capacity, air conditioning and pressurization, fuel management and the auxiliary power engine, known collectively as aircraft support subsystems.

These systems are independent of one another. They are controlled via separate interfaces.

In general, the control interfaces of the avionics and of mission management are disposed facing the pilot and on his sides, under the windshield, the control interface of the support subsystems being placed on the ceiling, between the pilot and the copilot, so as to be accessible to each.

FIG. 1 is a schematic representation of an aircraft cockpit showing the position of the control interfaces of the different systems of the aircraft.

As illustrated, cockpit interface 100 can be divided into five main zones: the flight commands of the pilot and copilot, referenced 105-1, 105-2 and 105-3, the avionics control and mission management interfaces, referenced 110, 115 and 120, the main purpose of zone 120 being control of the automatic pilot, and the command interface of the support subsystems, referenced 125.

The flight controls referenced 105-1 to 105-3 have the purpose of controlling the main devices used to pilot an aircraft, and thus in particular of controlling yaw, pitch and roll. These commands are often mechanical or electrical.

The avionics control interface generally comprises a large number of buttons, each having a particular function. These buttons are substantially multi-position buttons, especially of the start/stop type as well as buttons of rotary switch type for defining values.

By virtue of the complex nature of the input information items, the mission management interface comprises alphanumeric input keys as well as pointing devices. Examples of the pointing device are a control ball, known as trackball in English terminology, or a tactile pad, known as touchpad in English terminology.

The support subsystem command interface, installed in the ceiling and known as OVHP (the initials for OVer Head Panel in English terminology) or OVH, comprises substantially multi-position buttons, especially of the start/stop type as well as buttons of rotary switch type. These buttons are generally provided with an illumination system, for example with the light shining through, by means of which an anomaly of the functionality associated with the button can be indicated. This system of signaling by illumination of buttons makes it possible to install a system management philosophy known as dark cockpit philosophy in English terminology, which consists in indicating the nominal state of a function by the dark state of its command buttons and, conversely, in indicating an abnormal state by the illuminated state of its command buttons. The application of this philosophy therefore makes it possible to identify a button quickly when a problem is detected and to view the status of all of the support subsystems.

SUMMARY OF INVENTION

Although the interfaces for control of the avionics, for control of the support subsystems and for mission management are entirely satisfactory to the pilots, they nevertheless have certain disadvantages. In particular, the complexity of procedures to be followed, especially when a fault is detected, combined with the number of buttons in the cockpit, may lead to a pilot error.

The object of the invention is to improve the cockpit interface in order to reduce the workload of the pilot and to improve the safety of aircraft.

The object of the invention is therefore a method for exchanging data between a technical management system of an aircraft and a mission management system of the said aircraft, in order to permit one of the said systems to determine the consequences of an event detected in the other of the said systems, this method comprising the following steps,

- detecting at least one event in one of the said technical management and mission management systems of the said aircraft;
- transmitting at least one information item pertaining to the said detected event to the other of the said technical management and mission management systems of the said aircraft;
- determining consequences of the said detected event in the said other of the said technical management and mission management systems of the said aircraft; and,
- evaluating the adaptation of at least one datum of the said other of the said technical management and mission management systems of the said aircraft in response to the said determination step.

In this way the method according to the invention makes it possible to improve the control interface of the systems of the aircraft, to reduce the workload of the crew and to limit the risks of errors associated in particular with bad acquisitions.

Advantageously, the method additionally comprises a step of modifying the said at least one datum of the said other of the said technical management and mission management systems of the said aircraft in response to the said step of evaluating the adaptation of the said at least one datum. In this way the method according to the invention makes it possible to reduce even more the workload of the crew and to limit the risks of associated errors.

According to a particular embodiment, the method additionally comprises a step of displaying the said evaluation of the adaptation of the said at least one datum of the said other of the said technical management and mission management systems of the said aircraft, to permit the crew to be aware of the evaluated adaptation.

Preferably the method additionally comprises a step of validating the said evaluation of the adaptation of the said at least one datum of the said other of the said technical management and mission management systems of the said aircraft, in order to permit the crew to maintain control of the systems of the said aircraft.

According to another particular embodiment, the said display step comprises a step of displaying an activatable representation of a control command of at least one device of at least one of the said technical management and mission management systems of the said aircraft, the said validation step comprising a step of activating the said command permitting contextual access to the control commands of the systems.

Advantageously the said display and validation steps are employed in a centralized software interface of the said technical management and mission management systems of the said aircraft, in order to simplify the control interface of the systems, to reduce the costs of manufacture of aircraft by reducing the cabling necessary for control of the systems and to make it easy to personalize the control interface.

According to a particular embodiment, the method additionally comprises a step of analysis of the said detected event, the said step of transmitting the said at least one information item pertaining to the said detected event being effected in response to the said analysis step, in order to limit data exchange between the systems.

According to another particular embodiment, the method additionally comprises a step of determining the state of the said aircraft, the consequences of the said detected event being determined as a function of the said state, and the adaptation of the said at least one datum being evaluated as a function of the said state, so that it can be improved.

Another object of the invention is a device comprising means capable of employing each of the steps of the method described in the foregoing as well as an aircraft comprising this device.

BRIEF DESCRIPTION OF THE DRAWINGS

Other advantages, objectives and characteristics of the present invention will become apparent from the detailed description hereinafter, provided by way of non-limitative example, with reference to the attached drawings, wherein:

FIG. 4 illustrates a first example according to which the detection of a fault of a technical element of the aircraft is transmitted to the mission management system, in order to permit automatic evaluation of the restrictions imposed by the fault on the operation of the aircraft;

FIG. 9 shows a block diagram comprising representations of commands such as those illustrated in FIGS. 7 and 8, these representations being capable of being used to activate the commands;

DESCRIPTION OF THE PREFERRED EMBODIMENTS

In general, the object of the invention is data exchange between, on the one hand, the technical management system of the aircraft, or in other words the control system of the avionics and/or of the support subsystems, and, on the other hand, the mission management system, in order to permit one system to take into account a modification detected or received by another system, so as to reduce the workload of the pilot.

Thus, for example, if a fault is detected in the avionics, the effects of this fault are transmitted to the mission management system in order that, as the case may be, the mission parameters can be modified. In the same way, mission-related information items can be transmitted to the avionics and/or to the control system of the support subsystems, in order to modify the configuration of the aircraft.

Consequently, the cockpit is reorganized to permit interaction between the systems for control of the avionics, comprising mission management, and for control of the support subsystems.

Figure 1:
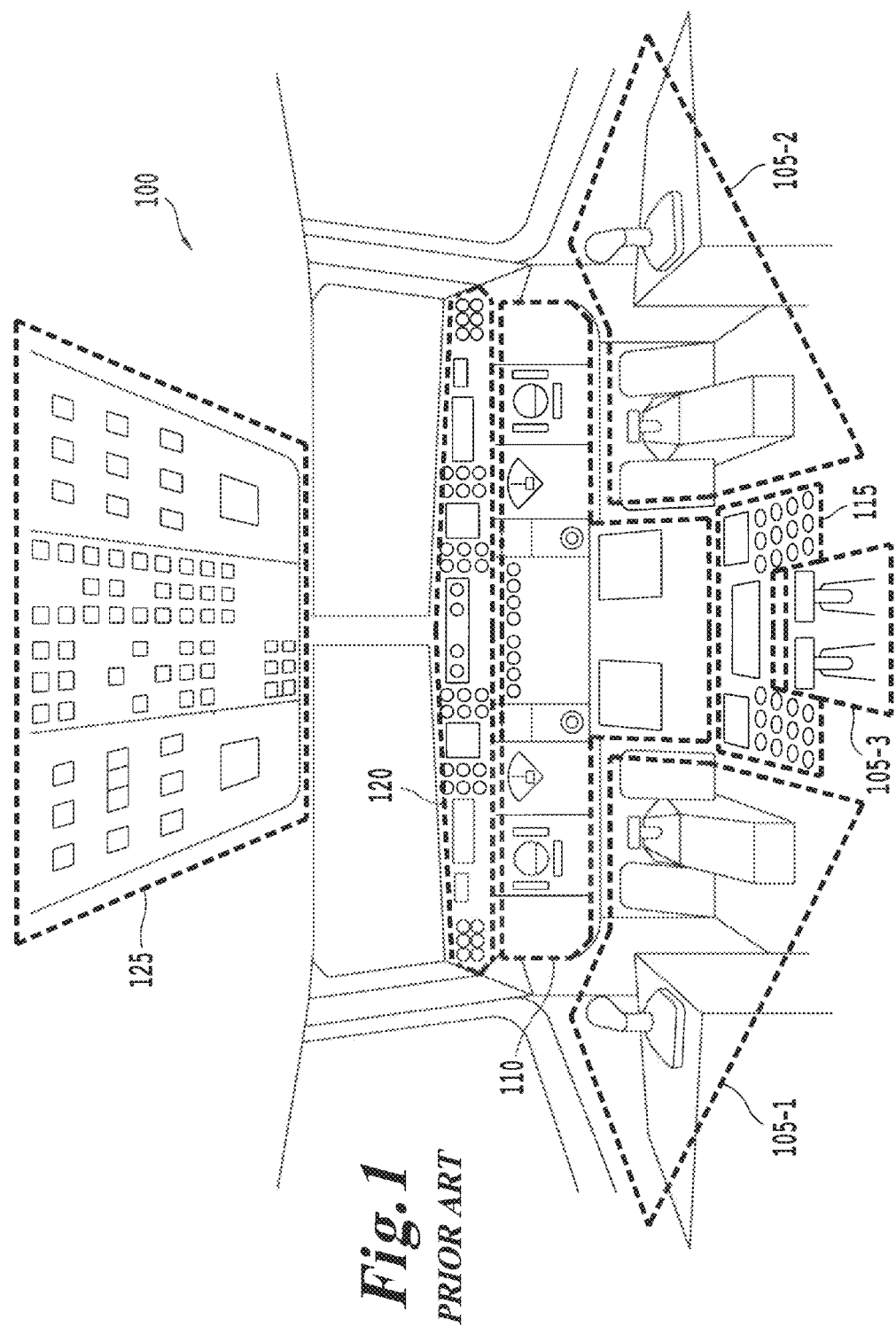
FIG. 1 is a schematic diagram of an aircraft cockpit showing the position of the control interfaces of the different systems of the aircraft.
Figure 2:
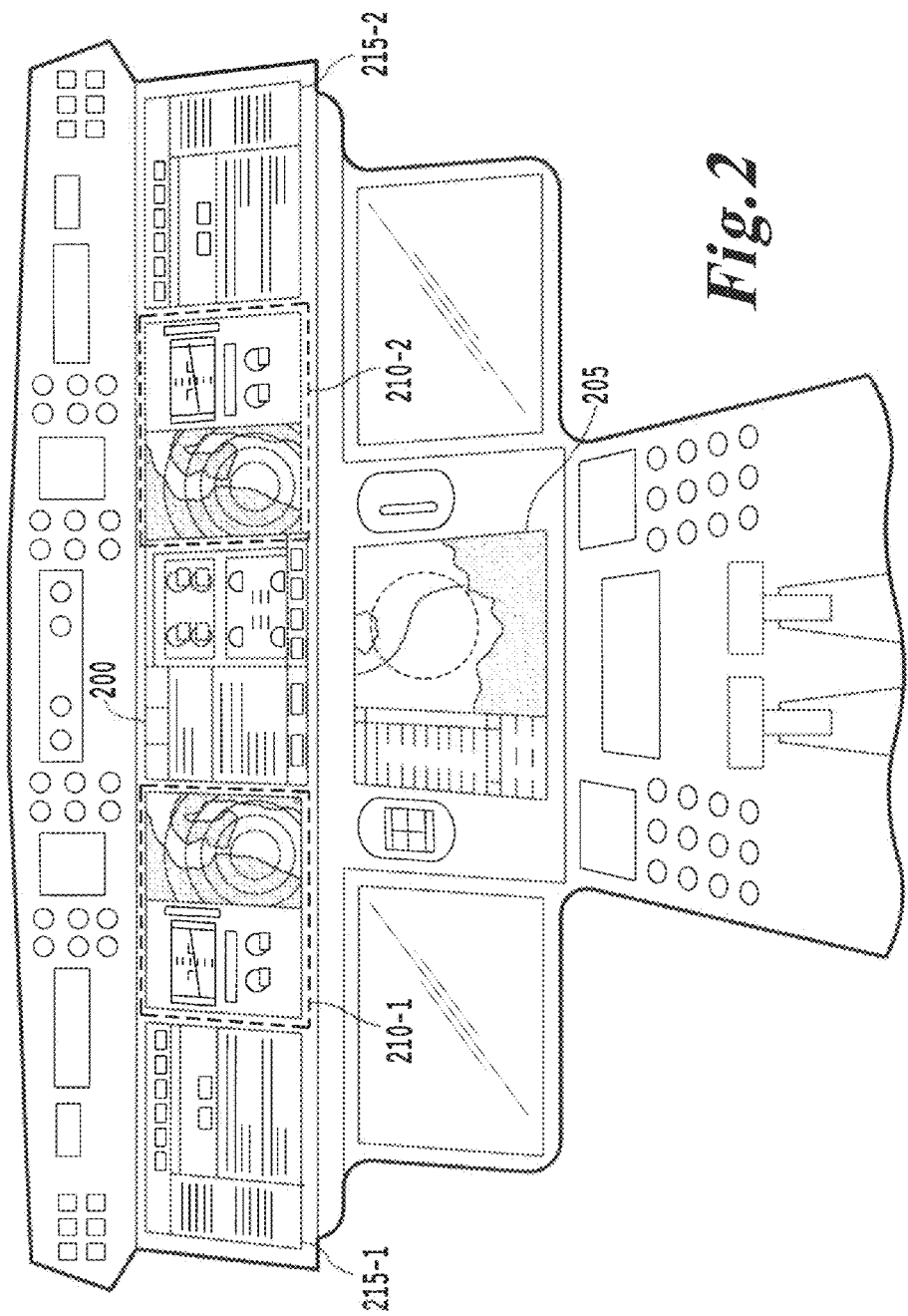
FIG. 2 illustrates an example of a cockpit configuration adapted to implement the invention.

FIG. 2 illustrates an example of a cockpit configuration adapted to implement the invention.

The cockpit comprises a central technical control screen 200, known as TMD (initials for Technical Management Display in English terminology), and a central mission management screen 205, known as MMD (initials for Mission Management Display in English terminology).

The cockpit also comprises two primary screens 210-1 and 210-2, known as PD (initials for Primary Display in English terminology), and two complementary screens 215-1 and 215-2 of OIS/CDS type (initials for Onboard Information System and Control and Display System in English terminology), situated in front of the pilot and copilot respectively.

Screens 200 and 205 are used as the main interface for management of the avionics, support subsystems and mission parameters, in cooperation with acquisition means such as a keyboard, a pointing device for moving a cursor and/or a touch technology combined with one or both screens. The pointing device is, for example, a trackball or a touchpad.

The interface employed via screens 200 and 205 makes it possible in particular to define and modify the technical configuration parameters and the mission parameters.

In addition, this interface makes it possible, preferably with the aid of screen 200, to manage the mission functions such as displaying alert messages, employing functions that aid in the decisions concerning operation of the aircraft when at least one fault is detected, looking up the on-board journal, known as logbook in English terminology, and acquiring entries therein.

Similarly, this interface is used, preferably with the aid of screen 205, as a flight management system, known as FMS (initials for Flight Management System in English terminology), for execution of mission applications and operational applications, especially applications that calculate the performance of the aircraft.

Figure 3:
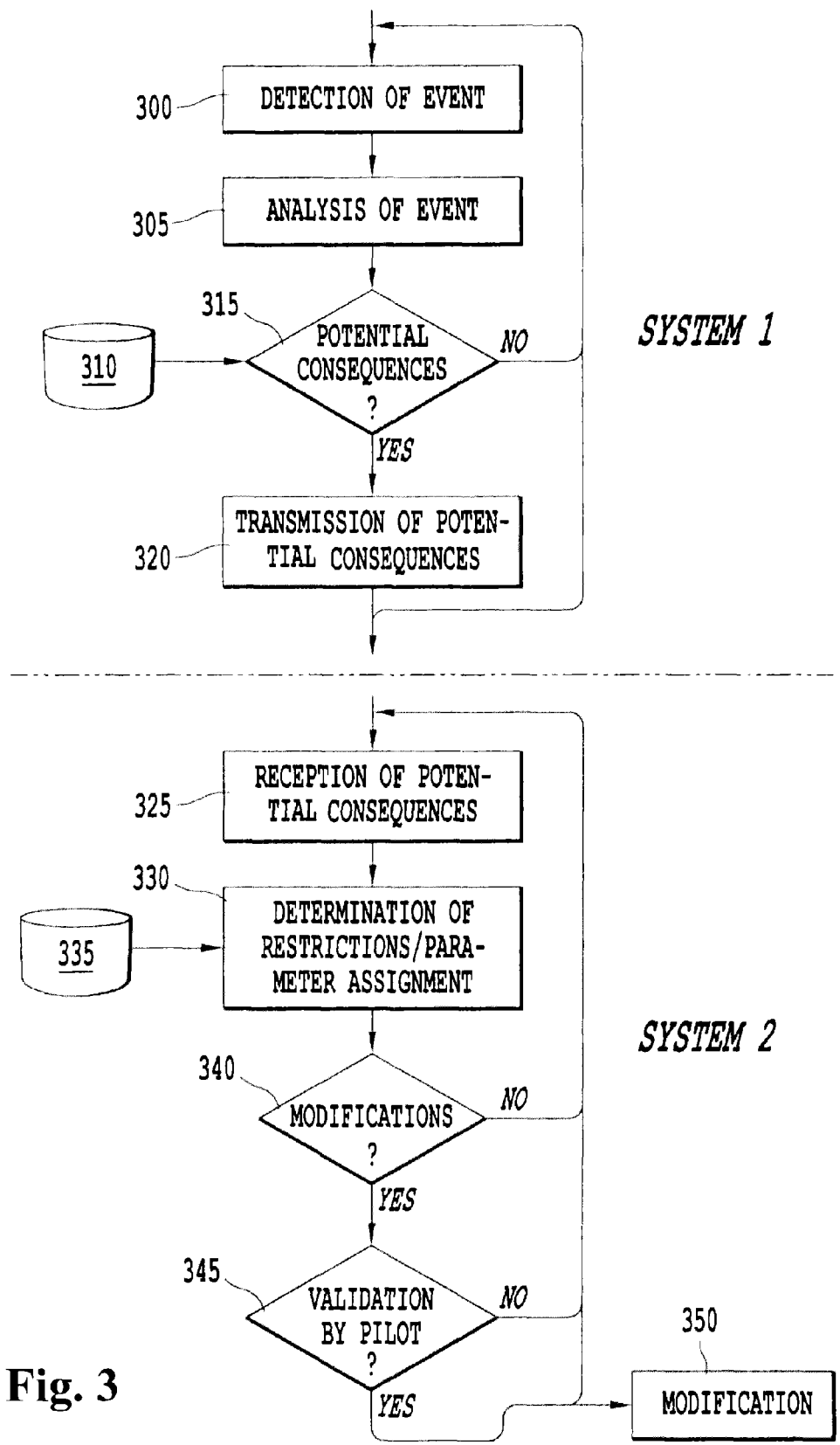
FIG. 3 shows an example of an algorithm for transmitting data capable of modifying the configuration of the aircraft and/or of the mission, these data being exchanged between the technical management system of the aircraft and the mission management system.

FIG. 3 shows an example of an algorithm for transmitting data capable of modifying the configuration of the aircraft and/or of the mission, these data being exchanged between the technical management system of the aircraft (avionics or support subsystems) and the mission management system.

In this case the algorithm comprises two parts. A first part is employed in a first system. Its purpose is to detect and analyze an event as well as to transmit information items pertaining to this event if it could have effects on a second system. The second part is employed in the second system. It relates to determining the effects of the detected event and, as the case may be, taking them into account.

As indicated in the foregoing, the first and second systems are in this case the technical management system of the aircraft and the mission management system. If the first system is the technical management system of the aircraft, the second system in this case is the mission management system. Conversely, if the first system is the mission management system, the second system in this case is the technical management system of the aircraft.

Advantageously, each of the parts of the algorithm shown in FIG. 3 is employed in each of the technical management system of the aircraft and the mission management system, thus making it possible for each system to take into account events determined in the respective other system.

The purpose of a first step (step 300) is to detect an event. In this case an event is considered according to a broad definition. It may involve detection of a fault, a datum received from an aircraft system or from an external system, or a datum acquired by the pilot.

The event is then analyzed (step 305) to determine if it is capable of affecting the second system. For this purpose, the potential consequences of the event are determined. According to a particular embodiment, the potential consequences of an event are stored in memory in a predetermined table, whose input corresponds to a reference to the events. Such a table is stored in this case in database 310.

Examples of the potential consequences are restrictions of the configuration of the aircraft, such as the maximum engine power that can be used, or mission restrictions, such as a maximum flight altitude.

A test is then performed to determine if the detected event is capable of affecting the second system (step 315). If not, the preceding steps (steps 300, 305 and 315) are repeated as soon as another event is detected.

If the detected event is capable of affecting the second system, an event identifier, the potential consequences associated with the event, or any other information item pertaining thereto are transmitted to the second system (step 320).

As suggested by the horizontal dashed line, steps 300, 305, 315 and 320 are employed in the first system. Database 310 may be specific to the first system or common to the first and second systems.

After the identifier of a detected event, the potential consequences associated with this event, or any other information item pertaining thereto has or have been received (step 325), the second system determines the restrictions or the modifications of parameter assignments resulting therefrom (step 330), for example by comparing the potential consequences of the event with the configuration of the aircraft or with the mission parameters. The configuration data and/or the parameters can be stored in memory in database 335.

Database 335 may also be used to store in memory a predetermined table, whose input corresponds to a reference to the event, in order to permit determination of the potential consequences of an event as a function of references to it.

The modifications of parameter assignments associated with an event depend on the nature of the detected event.

A test is then performed (step 340) to determine if it is appropriate to modify certain parameters of the aircraft (avionic, support subsystem or mission). If not, the preceding steps are repeated while waiting for a new detected event potentially having effects on the second system. If yes, the adaptation of these parameters is evaluated and the parameters are modified (step 350).

According to a preferred embodiment, the parameters of the aircraft are modified only after validation of these modifications by the pilot (step 345).

After the parameters of the aircraft have been modified, or when the pilot does not validate the modifications, the preceding steps are repeated while waiting for a new detected event potentially having effects on the second system.

As suggested by the horizontal dashed line, steps 325, 330 and 340 to 350 are employed in the second system. Database 335 may be specific to the first system or common to the first and second systems.

FIG. 4 illustrates a first example according to which the detection of a fault of a technical element of the aircraft is transmitted to the mission management system, in order to permit automatic evaluation of the restrictions imposed by the fault on the operation of the aircraft.

Thus FIG. 4 comprises two pages that can be displayed on the screens for control of the parameters of an aircraft and of mission parameters when a technical fault is detected, according to the algorithm shown in FIG. 3.

According to this example, the avionics control system detects a fault of the deicing system. Such a fault has the consequence of restricting the operation of the aircraft, which is unable to fly in zones where the temperature is such that a risk of formation of ice on the aircraft exists.

Thus, according to the invention, not only is an alert message transmitted to the pilot, but also the mission management system, having received the information item about the fault, indicates to the pilot the operational consequences of the fault.

Page 400, displayed on central technical control screen 200, in this case comprises an alert in the form of message 405, indicating failure of the deicing system, also known as deicing or anti-icing in English terminology.

At the same time, page 410, displayed on central mission management screen 205 and in this case containing a cartographic background 415 representing the zone over which the aircraft is flying in the course of the mission, or part thereof, indicates a zone 420 by superposition. Zone 420 is advantageously indicated with the aid of a particular texture and/or color, leaving the cartographic background partly visible. Zone 420 represents a zone to be avoided because of the detected fault. In this case it is a zone in which the temperature is such as to pose a risk of formation of ice on the aircraft.

In the same way, if a fault is detected in the pressurization system of the aircraft cabin, the transmission of an information item pertaining to this fault to the mission management system permits this system to modify the flight plan or to suggest a modification thereof in order to comply with a reduced ceiling.

Conversely, a parameter of the mission management system may be transmitted to configure the technical management system of the aircraft.

Thus, for example, if the airline company operating the aircraft transmits to the mission management system thereof an information item pertaining to its policy of reducing engine power during takeoff phases to prolong engine life and to limit fuel consumption, this information item is transmitted to the technical management system of the aircraft in conformity with the algorithm shown in FIG. 3.

On the basis of this information item, a new technical configuration of the aircraft is used to stop the deicing system, in order to employ the strategy of the airline company (it is recalled here that the deicing system uses air coming from the jet engines, with the consequence that this system uses part of the power of this air).

As indicated in the foregoing, if the parameters of the aircraft and/or of the mission can be assigned automatically in response to the detection of an event, it is preferable in numerous cases, especially for safety reasons, that the new parameter assignments be validated by the pilot.

Although the mission management system generally offers a software interface, the systems for control of the avionics and support subsystems often use specific buttons. It is therefore advantageous to employ a centralized software interface making it possible in particular to control the systems for control of the avionics, for control of the support subsystems and for mission management.

Preferably the commands accessible via this interface are grouped according to their functions and not according to the systems with which they are associated. Advantageously, the number of simultaneously accessible commands is restricted. These commands are selected in this case according to a context, the context itself being determined as a function of the state of the aircraft, such as starting, stopping or the phase of flight (taxiing on the ground, takeoff, climbing, cruising, descent, landing) and as a function of the detection of a breakdown or fault or of potential consequences resulting therefrom.

In this way the centralized software interface offers selective, contextual and interactive access to the different systems of the aircraft as well as the possibility of automatically sequencing several commands.

In combination with the algorithm described with reference to FIG. 3, this interface makes it possible to reduce the load on the pilot, since the commands are selected as a function of the context, and to improve the safety of the aircraft, since commands that have no use for the context under consideration are not directly available.

Thus, when an event is detected in a system, the pilot does not have to determine if it has an effect on another system, since the interface automatically suggests modifications resulting from this event to the pilot. The pilot may then validate them or not validate them.

Furthermore, the state of the devices associated with the accessible commands is preferably displayed in association with the representations of these commands. Such a representation makes it possible to optimize the pilot's vision of the elements of the aircraft.

Although such an interface makes it possible to replace all of the specific buttons, especially the buttons of the technical management system of the aircraft, it is nevertheless possible to retain some or all of these buttons, for example, to satisfy the needs of redundancy or to offer a double interface system that is particularly adapted to certain emergency situations. Thus the following different implementations may be employed:

all of the commands are accessible via the software interface and the specific buttons;

all of the commands are accessible via the software interface, certain commands also being accessible via specific buttons;

all of the commands are accessible via the software interface, none being accessible via specific buttons;

certain commands are accessible via the software interface, all of these commands being accessible via the specific buttons; and, certain commands are accessible via the software interface, and certain commands are accessible via specific buttons, some commands able to be accessible via the software interface and specific buttons.

Figure 5:
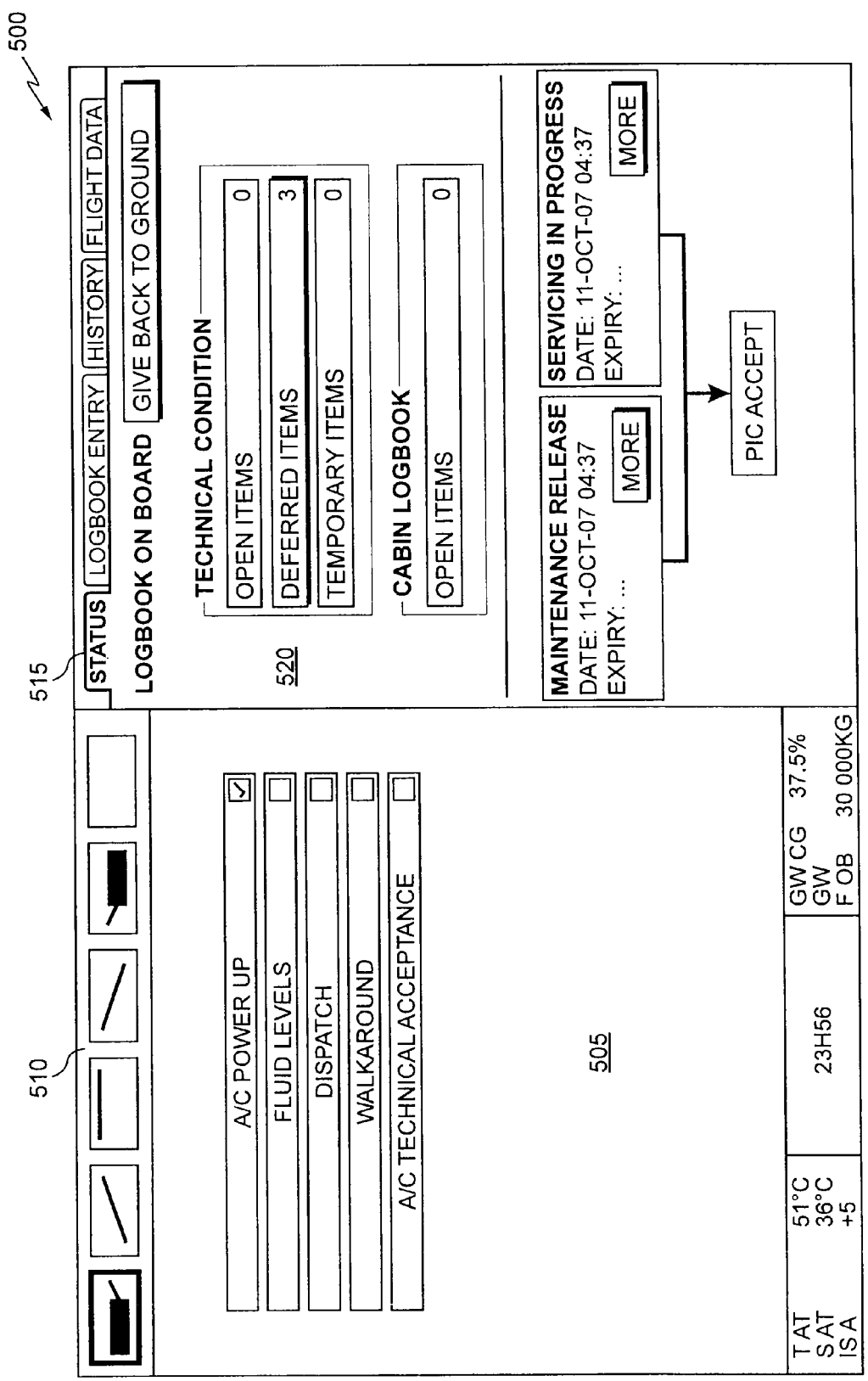
FIGS. 5 and 6 show pages of an example of a man-machine interface making it possible to access the parameters of the aircraft in hierarchical and contextual manner in order to control, modify and/or acquire them as well as to access activatable representations of commands via the interface.

FIG. 5 shows a first page of an example of a man-machine interface for accessing the technical parameters of the aircraft (avionic and support subsystems) in hierarchical and contextual manner, in order to control, modify and/or acquire them as well as to access activatable representations of commands via the interface. In this case interface 500 comprises a part, situated at the left, for selecting the actions or the verifications to be performed (reference 505) according to the state of the aircraft (reference 510).

Advantageously, the state of the aircraft is determined automatically. On the basis of this state, the accessible functions and parameters are determined and presented to the pilot. The functions are advantageously grouped according to their nature. According to the example presented in FIG. 5, the aircraft is on the ground and is being prepared for a mission, as illustrated by the selection of the icon situated at the top left. The starting parameters have been entered and verified, since the "A/C power up" indication has been validated. The pilot can now verify the level of the fluids ("Fluid levels"), the capacity of the aircraft to undertake the mission ("Dispatch") and other parameters of the aircraft ("Walkaround"), or can accept the technical parameters of the aircraft associated with the mission to be undertaken ("A/C technical acceptance").

The right part of the interface is used in this case to present and modify information items such as statuses, a logbook, a history and flight data. These information items can be selected according to their category, for example with the help of tabs as illustrated. In the present case, tab 515, associated with status information items, is selected. This tab makes it possible in particular to access the list of detected faults, known as "open items", and the list of deferred detected faults, known as "deferred items", from zone 520.

The contextualization of access to parameters and to functions additionally makes it possible to guide the pilot in the configuration of the aircraft and in the verifications to be performed. In this way it is possible to employ verification means in order to signal anything overlooked to the pilot, for example in the form of an alert message.

Page 500 can be used as the main page for accessing the parameters and functions accessible via this interface.

Figure 6:
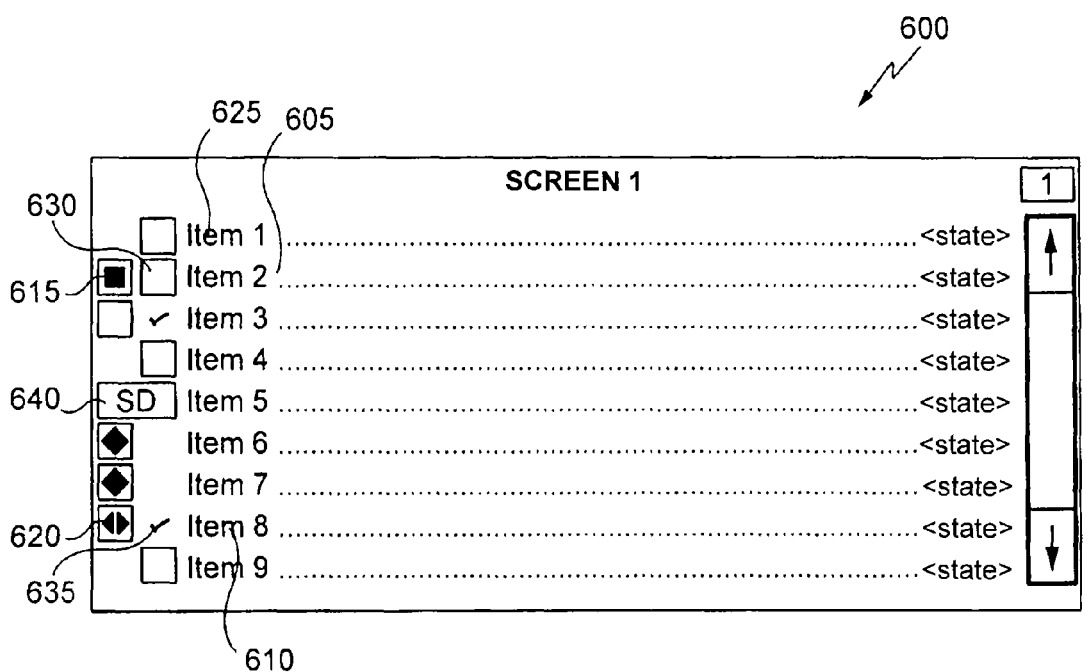

FIG. 6 represents a page of a second example of a man-machine interface for accessing the aircraft parameters in hierarchical and contextual manner, in order to control, modify and/or acquire them as well as to access activatable representations of commands via the interface. The example illustrated shows, for example, a page automatically displayed when an insufficient fuel pressure is detected or when smoke is detected. This page permits the pilot to be warned of the fault, to verify the parameters of the elements associated with this incident and to take the necessary actions.

Simultaneously, the screen of the mission management system can display a cartographic background similar to that presented in FIG. 4, and indicate advised landing zones or the radius of action of the aircraft beyond which the safety thereof may be compromised.

Text interface 600 makes it possible in particular to select groups of commands or block diagrams by using links associated with the presented lines and to guide the pilot or copilot in performing the necessary configurations. Each line in this case represents one or more tasks and/or verifications to be performed or one or more functions.

Interface 600 such as represented contains two rows of indicators, situated on the left of the screen, each indicator being associated with one line. The first column indicates the presence or absence of a link. In other words, when a square is represented in the first column, it means that a link is associated with the line. When this square contains arrows, the link makes it possible to reach a group of commands, for example in the form of a block diagram. The second column provides an indication relating to execution of actions or verifications corresponding to the object of the line under consideration. This indication may be automatically updated if the actions or verifications have been performed via the software interface or manually updated if the actions or verifications were performed via specific buttons.

Thus, by way of illustration, lines 605 and 610 comprise indicators 615 and 620 in the first column, showing that they are associated with a link, whereas line 625 does not have any link. It will be noted in addition that indicator 620 contains arrows indicating that it is possible, from this indicator, to reach parameters and/or representations of commands relating to the object of line 610. Similarly, it should be noted that indicator 630 shows that the actions and/or verifications associated with the object of line 605 have not been executed, while indicator 635 shows that the actions and/or verifications associated with line 610 have been effected. Indicator 640 relates to a link making it possible to reach representations of commands accessible via software interface 600, execution of which can be indicated by a particular color (the initials SD, which stand for System Display in English terminology, indicate here that the corresponding command or commands is or are accessible via the software interface).

Furthermore, the interface presented in FIG. 6 comprises, on the right part of the screen, scroll arrows with which the text situated above or below the displayed text can be viewed.

Naturally, other types of indicators may be used.

The centralized interface comprises several pages, which in particular can be presented in text form or in the form of block diagrams. The composition of these pages can be predetermined and stored in memory in a database. This composition may also be determined dynamically according to the selections of the pilot or copilot, the state of the aircraft and/or the detected events.

According to a particular embodiment, the pages that are to be displayed are determined according to a mechanism of links such as described in the foregoing, to the state of the aircraft and to the detected events, such as a fault, in which case a correspondence table between the detected events and the pages that must be displayed is established.

Advantageously, the detection of a fault leads to the display of the page containing the parameters and/or the representations of commands corresponding to this fault, as a function of the predetermined correspondence table.

A priority mechanism may be employed. Thus, if a fault that does not have an important consequence is detected, a simple alert may be generated, the page comprising the parameters and/or the representations of the corresponding commands being displayed only after acceptance by the pilot or copilot. For a fault having direct consequences for the safety of the aircraft, the page comprising the parameters and/or the representations of the corresponding commands is displayed directly, to permit the pilot or copilot to take the necessary actions rapidly.

Figure 7:
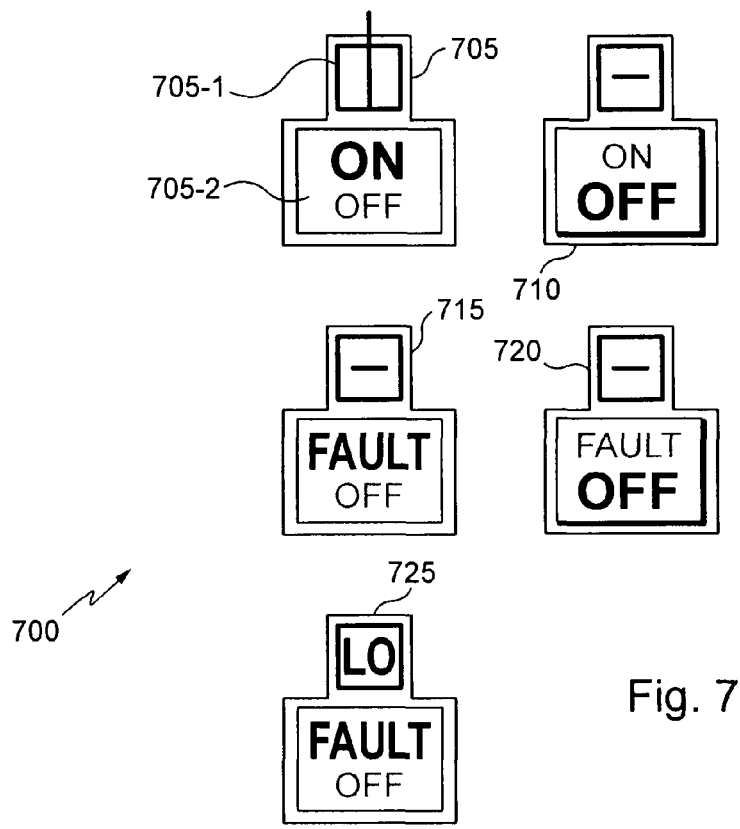
FIG. 7 illustrates an example of representations of a command that can be used to activate the associated command and to view the state of the commanded device.

FIG. 7 illustrates an example of representations of a command that may be used to activate the associated command, in this case a support subsystem command, and to view the state of the commanded device.

Thus reference 700 relates to the representation of a command according to several states of the command and of the associated support subsystem. In the present case a pump command is considered.

Reference 705 presents the command and the state of the pump when it is activated ("on"). Virtual button 705 in this case comprises two parts, a part 705-1 in which there is represented an icon indicating the status of the support subsystem and a part 705-2 describing the state of the command as well as the status of the support subsystem in text form. The command represented here is a binary command ("on" or "off"), and so it is sufficient to select representation 705 and operate an activation button to change its state. Thus, for example, representation 705 may be selected by means of a pointer such as a mouse, and the state may be changed by a click of the mouse. Other methods may also be used, such as a touch screen in which the state of the command can be selected and changed directly.

Reference 710 presents the command and the state of the pump when it is deactivated ("off"). As illustrated, the icon is modified to indicate the state of the pump, and the text is changed.

Reference 715 presents the command and the state of the pump when a fault is detected ("fault"). As illustrated, the icon is modified to indicate the deactivated state of the pump, even though the pump has not been stopped.

Reference 720 presents the command and the state of the pump when a fault is detected ("fault") but when the pump is voluntarily deactivated ("off"). As illustrated, the icon is modified to indicate the deactivated state of the pump.

Finally, reference 725 presents the command and the state of the pump when a fault is detected ("fault") but the pump continues to operate in a degraded mode. As illustrated, the icon is modified to indicate the degraded state of the pump ("lo"). A corresponding text indication is displayed ("fault").

A color code may be associated with the representations of the commands. For example, the icons may be green if the support subsystem is operating correctly, orange if it is in a degraded mode and red if it is faulty. In this way the pilot and copilot can view the state of the represented support subsystems at a single glance.

It should be noted here that, if a command of the software interface can be used in a manner similar to that of a specific button to accomplish an action, a command of the software interface can also be associated with a sequence of other commands. This type of command offers numerous advantages in terms of reaction time and in terms of updating the functions of an aircraft, since a command may be modified or added at any time.

By way of illustration, one command may simultaneously control the opening or closing of a valve as well as the starting or stopping of a pump. In this case, the representation of the support subsystem preferably indicates the state of all of the controlled support subsystems. Thus a breakdown state will be displayed if either the pump or the valve is defective.

Figure 8:
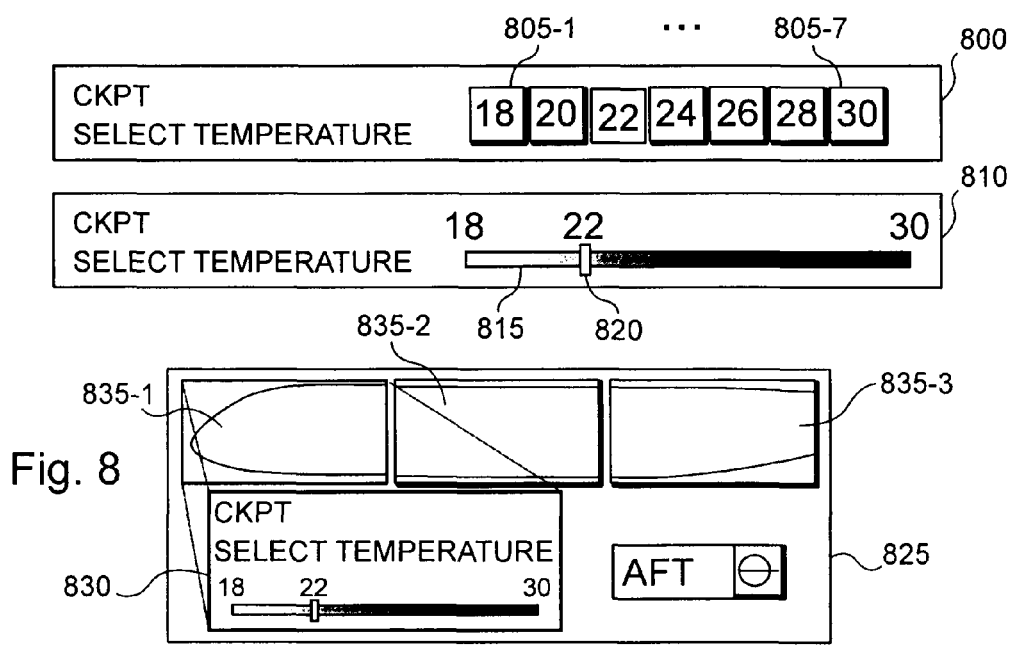
FIG. 8 illustrates an example of control of a parameter, such as the temperature, that can take on several values, via a representation of the associated command.

FIG. 8 illustrates an example of control of a parameter, in this case the temperature, that can have several values. According to the example referenced 800, the temperature is selected with the aid of several buttons referenced 805-1 to 805-3, each button corresponding to one temperature. Alternatively, according to the example referenced 810, the temperature is selected by moving a cursor 820 along a graduated bar 815.

The selection of the temperature may be coupled with a zone selection mechanism as illustrated by reference 825. According to this example, a temperature selection mechanism 830, such as mechanism 800 or mechanism 810, is associated with several buttons referenced 835-1 to 835-3, permitting a zone of the aircraft to be selected. The temperature regulated with the aid of mechanism 830 corresponds to the activated zone or zones.

Advantageously, the commands illustrated in FIGS. 7 and 8 are integrated into block diagrams such as that represented in FIG. 9, in order to make it possible to view the controlled device in its environment. Such a block diagram can be reached from a link such as those presented in reference to FIG. 6.

The diagram illustrated here concerns a fuel-management system generically referenced 900. This diagram makes it possible to view the relationships between the different commands as well as their effects. For example, it is easy to see that commands 905-1 and 905-2 are redundant and that pump 905-1, functioning in degraded mode, is backed up by pump 905-2 to convey the fuel to open valves 910-1 and 910-2.

According to a particular embodiment, the granularity of block diagrams is variable. Thus each command shown may relate to one element or a to a set of elements. The displayed state then represents the state of one element or of a set of elements. Depending on the parameters used, the selection of a command makes it possible to modify the state of the command or to access the different elements controlled by the command.

Figure 10:
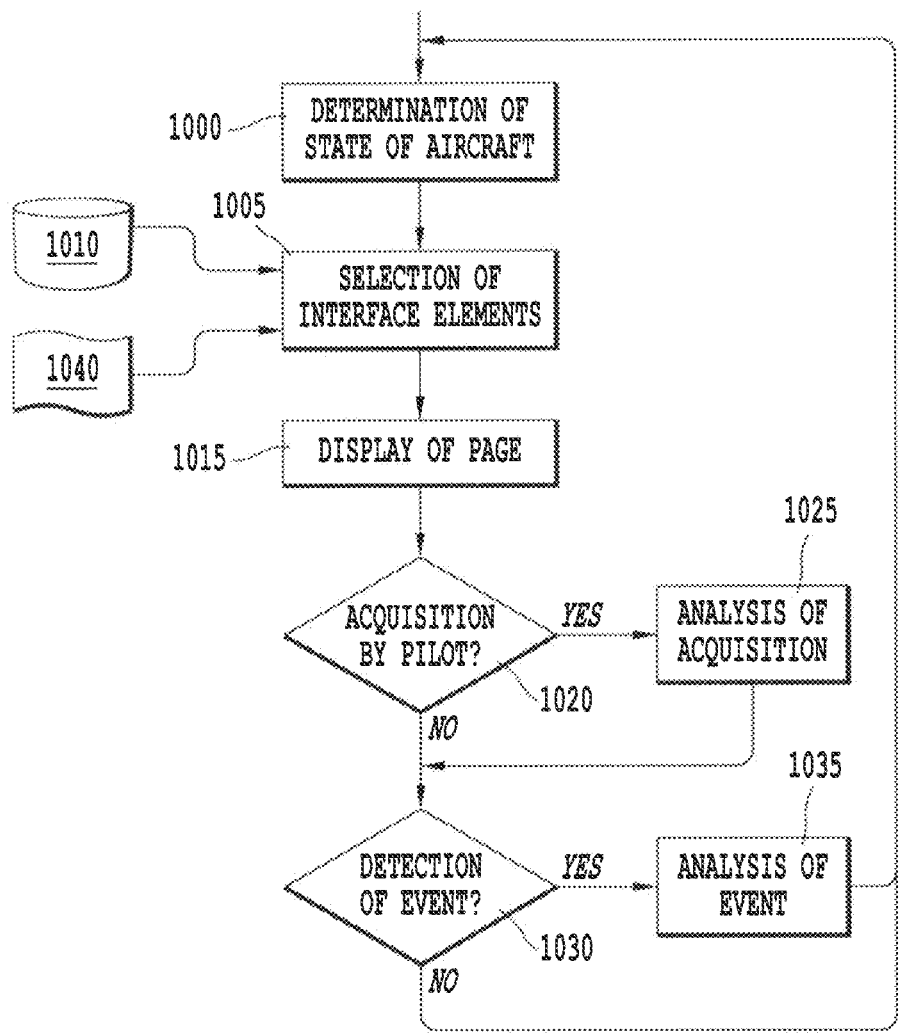
FIG. 10 illustrates an example of an algorithm employed to control the elements of the software interface making it possible to access pages comprising parameters to be verified, modified or acquired and/or representations of commands; and, FIG. 11 illustrates an example of a physical architecture adapted for employment of the invention.

FIG. 10 illustrates an example of an algorithm employed to control the elements of the software interface with which it is possible to access pages comprising parameters to be verified, modified or acquired and/or representations of commands.

A step 1000 relates to determining the state of the aircraft compared with a list of predetermined states, such as starting, stopping or the phase of flight, especially taxiing on the ground, takeoff, climbing, cruising flight, descent or landing.

A step 1005 has the purpose of selecting the elements of the software interface are to be displayed, or in other words determining parameters and/or commands for which a representation is to be displayed. As described in the foregoing, this selection may be achieved according to the inputs of the pilot or copilot, to the state of the aircraft, and/or to detected events. By default, elements for accessing the different block diagrams are displayed in text or graphical form. These elements, for example, are stored in memory in a database 1010 in the form of predetermined screen pages.

After they have been determined, these elements are displayed (step 1015) in the form of a page.

A test is then performed to determine whether the pilot or copilot has selected an element of the displayed page or has acquired a datum linked to the software interface (step 1020). If the pilot or copilot has selected an element of the displayed page or has acquired a datum linked to the software interface, an analysis of the acquisition is performed (step 1025) so that it may be taken into account, especially to know whether it relates to the acquisition or modification of a parameter of the aircraft, to the activation of a command or to the selection of a link permitting the display of a new page.

Another test is then performed to determine if an event has been detected (step 1030). In this case an event is a fault, a change of configuration, or more generally any change that can be detected, preferably automatically.

If an event is detected, an analysis of the event is performed (step 1035) to determine the consequences thereof and to determine if it is appropriate to modify the contents of the displayed page.

The preceding steps are then repeated to determine the contents of the displayed page once again, if necessary.

The selection of elements of the displayed page then takes the state of the aircraft into account and, as the case may be, the acquisition performed by the pilot or copilot and/or the detected event.

Advantageously, the screen pages are organized hierarchically to permit navigation from one to the other according to the state of the aircraft, to an acquisition performed by the pilot (or copilot) and/or to detected events or to particular configurations. The structure of the hierarchy, for example, is stored in memory in file 1040, which can be stored in memory in database 1010 or in another storage zone.

The determined elements are then displayed (step 1015) and the process is continued.

Figure 11:
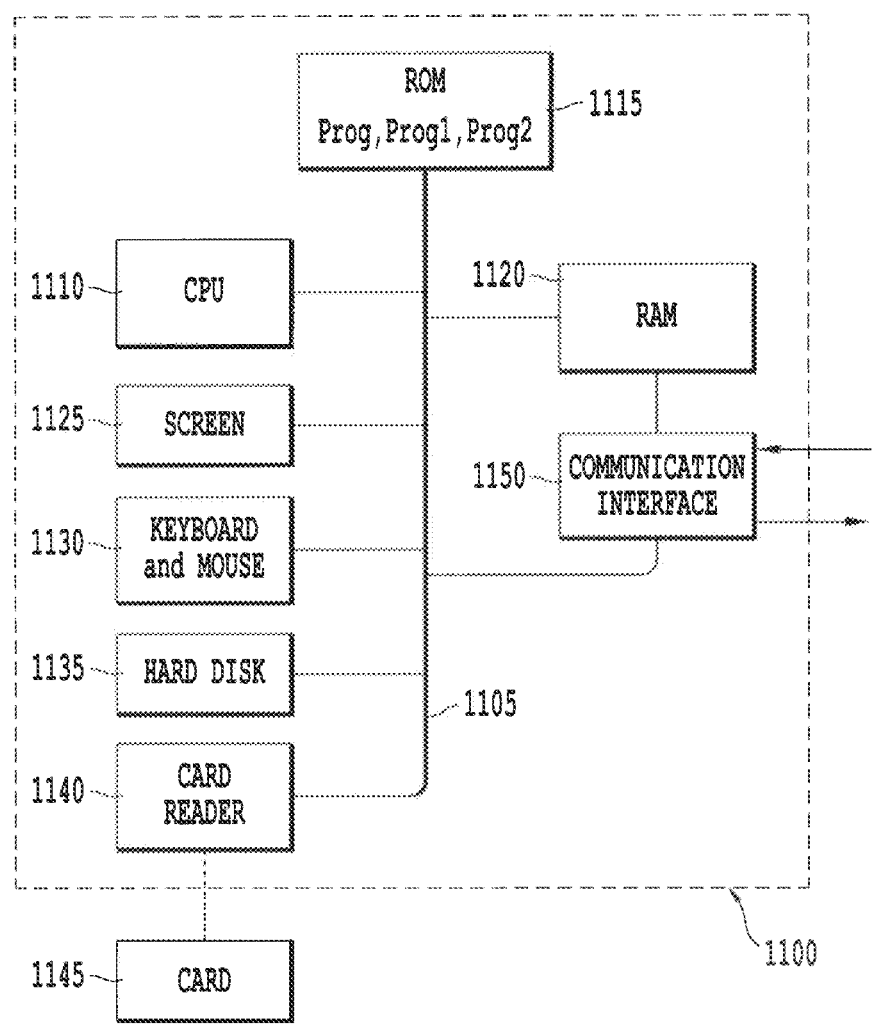

FIG. 11 illustrates an example of physical architecture adapted to implement the invention, especially each of the parts of the algorithm shown in FIG. 3. In this case device 1100 is provided with a communication bus 1105, to which there are connected:

- a central processing unit or microprocessor 1110 (CPU, initials for Central Processing Unit in English terminology);
- a read-only memory 1115 (ROM, acronym for Read Only Memory in English terminology), that can comprise the programs necessary for implementation of the invention;
- a random access memory or cache memory 1120 (RAM, acronym for Random Access Memory in English terminology), comprising registers capable of recording the variables and parameters created and modified in the course of execution of the aforesaid programs; and,
- a communication interface 1150, capable of transmitting and receiving data, especially to and from the support subsystems in order to control and know their state.

Preferably, device 1100 also has the following elements:

- a screen 1125, for viewing data such as representations of commands and for acting as a graphical interface with the user, who will be able to interact with the programs according to the invention, with the aid of a keyboard and of a mouse 1130, or of another pointing device such as a touch screen or a remote control;
- a hard disk 1135, that can comprise the aforesaid programs and data processed or to be processed according to the invention; and
- a memory card reader 1140 adapted to receive a memory card 1145 and to read or write therein data processed or to be processed according to the invention.

The communication bus permits communication and interoperability among the different elements included in device 1100 or connected thereto. The depiction of the bus is not limitative and, in particular, the central unit is capable of communicating instructions to any element of device 1100 directly or via another element of device 1100.

The executable code of each program permitting the programmable device to employ the processes according to the invention may be stored, for example, on hard disk 1135 or in read-only memory 1115.

According to one variant, memory card 1145 may contain data, especially a table of correspondence between the detected events and the commands that may be requested, as well as the executable code of the aforesaid programs which, once it has been read by device 1100, will be stored on hard disk 1135.

According to another variant, it will be possible for the executable code of the programs to be received at least partly via interface 1150 to be stored in a manner identical to that described in the foregoing.

More generally, it will be possible for the program or programs to be loaded into one of the storage means of device 1100 before being executed.

Central unit 1110 will command and direct the execution of the instructions or portions of software code of the program or programs according to the invention, which instructions are stored on hard disk 1135 or in read-only memory 1115 or else in the other aforesaid storage elements. During boot-up, the program or programs that is or are stored in a non-volatile memory, such as hard disk 1135 or read-only memory 1115, are transferred to random-access memory 1120, which then contains the executable code of the program or programs according to the invention as well as registers for storing in memory the variables and parameters necessary for implementation of the invention.

Naturally, to satisfy specific needs, an individual competent in the field of the invention will be able to apply modifications in the foregoing description.

The invention claimed is:

1. A method for exchanging data between a technical management system of an aircraft and a mission management system of the aircraft to permit each of the systems to determine consequences of an event detected in the other of the systems, the event including a fault detection, a datum received from an aircraft or external system, or a datum acquired by a pilot, the technical management system and the mission management system are independent of each other so that the technical management system manages technical management data and the mission management system manages mission management data, the method comprising:
   detecting, in one of the technical management system and the mission management system of the aircraft, at least one event including the fault detection, the datum received from the aircraft or external system, or the datum acquired by the pilot;
   transmitting, from each one of the technical management system and the mission management system, at least one information item pertaining to the detected event to the other of the technical management system and the mission management system of the aircraft;
   determining, in the other of the technical management system and the mission management system of the aircraft, consequences of the detected event;
   evaluating, by the mission management system, whether at least one datum in the mission management data managed by the mission management system should be adapted based on the at least one information item pertaining to the detected event, when the technical management system transmits the at least one information item pertaining to the detected event; and
   evaluating, by the technical management system, whether at least one datum in the technical management data managed by the technical management system should be adapted based on the at least one information item pertaining to the detected event, when the mission management system transmits the at least one information item pertaining to the detected event.

2. The method according to claim 1, further comprising:
   modifying the at least one datum of the other of the technical management system and the mission management system of the aircraft in response to the evaluating of the adaptation of the at least one datum.

3. The method according to claim 1, further comprising:
   displaying the evaluation of the adaptation of the at least one datum of the other of the technical management system and the mission management system of the aircraft.

4. The method according to claim 3, further comprising:
   validating the evaluation of the adaptation of the at least one datum of the other of the technical management system and the mission management system of the aircraft.

5. The method according to claim 4, wherein the displaying further comprises displaying an activatable representation of a control command of at least one device of at least one of the technical management system and the mission management system of the aircraft, and the validating further comprises activating the control command.

6. The method according to claim 4, wherein the displaying and validating are employed in a centralized software interface of the technical management system and the mission management system of the aircraft.

7. The method according to claim 1, further comprising:
   analyzing the detected event, and the transmitting of the at least one information item pertaining to the detected event is effected in response to the analyzing.

8. The method according to claim 1, further comprising:
   determining a state of the aircraft;
   determining the consequences of the detected event as a function of the state; and
   evaluating the adaptation of the at least one datum as a function of the state.

9. A device for exchanging data between a technical management system of an aircraft and a mission management system of the aircraft to permit each of the systems to determine consequences of an event detected in the other of the systems, the event including a fault detection, a datum received from an aircraft or external system, or a datum acquired by a pilot, the technical management system and the mission management system are independent of each other so that the technical management system manages technical management data and the mission management system manages mission management data, the device comprising:
   a detecting section, in one of the technical management system and the mission management system of the aircraft, configured to detect at least one event including the fault detection, the datum received from the aircraft or external system, or the datum acquired by the pilot;
   a transmitter configured to transmit, from each one of the technical management system and the mission management system, at least one information item pertaining to the detected event to the other of the technical management system and the mission management system of the aircraft;
   a determining section, in the other of the technical management system and the mission management system of the aircraft, configured to determine consequences of the detected event; and
   an evaluating section configured to evaluate
      when the technical management system transmits the at least one information item pertaining to the detected event, whether at least one datum in the mission management data managed by the mission management system should be adapted based on the at least one information item pertaining to the detected event, and when the mission management system transmits the at least one information item pertaining to the detected event, whether at least one datum in the technical management data managed by the technical management system should be adapted based on the at least one information item pertaining to the detected event.

10. An aircraft system in an aircraft for exchanging data between a technical management system of the aircraft and a mission management system of the aircraft to permit each of the technical management and mission management systems to determine consequences of an event detected in the other of the systems, the event including a fault detection, a datum received from an aircraft or external system, or a datum acquired by a pilot, the technical management system and the mission management system are independent of each other so that the technical management system manages technical management data and the mission management system manages mission management data, the aircraft system comprising:

a detecting section, in one of the technical management system and the mission management system of the aircraft, configured to detect at least one event including the fault detection, the datum received from the aircraft or external system, or the datum acquired by the pilot;

a transmitter configured to transmit, from each one of the technical management system and the mission management system, at least one information item pertaining to the detected event to the other of the technical management system and the mission management system of the aircraft;

a determining section, in the other of the technical management system and the mission management system of the aircraft, configured to determine consequences of the detected event; and an evaluating section configured to evaluate when the technical management system transmits the at least one information item pertaining to the detected event, whether at least one datum in the mission management data managed by the mission management system should be adapted based on the at least one information item pertaining to the detected event, and when the mission management system transmits the at least one information item pertaining to the detected event, whether at least one datum in the technical management data managed by the technical management system should be adapted based on the at least one information item pertaining to the detected event.

11. The method according to claim 1, wherein:
the technical management system includes a technical management interface having screens for the pilot to manage the technical management data, and the mission management system includes a mission management interface having screens for the pilot to manage the mission management data.

12. The device according to claim 9, wherein:
the technical management system includes a technical management interface having screens for the pilot to manage the technical management data, and the mission management system includes a mission management interface having screens for the pilot to manage the mission management data.

13. The system according to claim 10, wherein:
the technical management system includes a technical management interface having screens for the pilot to manage the technical management data, and the mission management system includes a mission management interface having screens for the pilot to manage the mission management data.

\* \* \* \* \*